June 29, 1926.
F. W. PARSONS
CROSSHEAD AND GUIDE
Filed Oct. 14, 1925
1,590,253
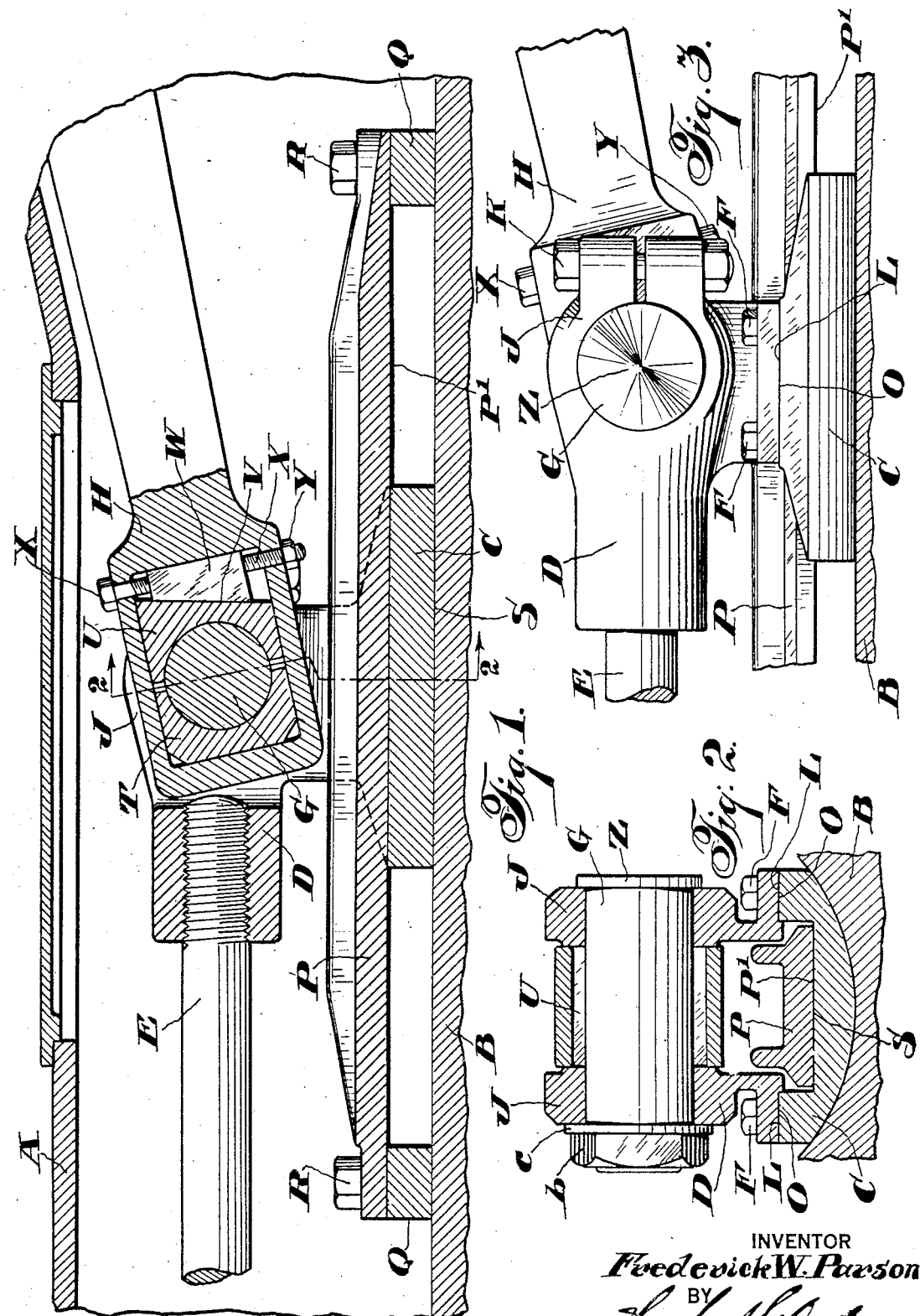
INVENTOR
Frederick W. Parsons
BY
Herbert G. Ogden
HIS ATTORNEY Patented June 29, 1926.

1,590,253

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

CROSSHEAD AND GUIDE.

Application filed October 14, 1925. Serial No. 62,396.

This invention relates to cross heads and more particularly to that type adapted to be used at the connection of the piston and connecting rods of reciprocating engines.

An object of this invention is to provide a cross head and guide assembly which may be readily adjusted for wear, and which has very liberal bearing surfaces.

Another object of my invention is to provide a cross head and guide which, in view of its great strength and large bearing area, is light in weight, while further objects are to provide a cross head which is accurately guided to resist thrust in all directions in a plane at right angles to its line of travel, and to provide a cross head assembly in which all the sliding surfaces are so located that they are continually submerged in a bath of oil, and are therefore thoroughly lubricated at all times.

The invention will be more clearly understood by reference to the accompanying drawings, in which—

Figure 1 is a longitudinal sectional view of a cross head and guide;

Figure 2 is a cross section taken along the line 2—2 looking in the direction of the arrows, and Figure 3 is a side view of the cross head and section of the lower cross head guide.

Referring to the drawings, the cross head comprises a casing A having a guide B formed integrally therewith upon which a slide member C is adapted to reciprocate, and a head D, into which a piston rod E is adapted to be screwed or otherwise secured, is mounted on the slide member C as, for instance, by means of the bolts F. The head D is forked to receive the bearing end of the connecting rod H, a connecting pin G being provided therefor. The forked ends J of the head D are split and provided with bolts K to clamp the pin G firmly in position.

The bearing part of the guide B is concave or trough shaped as shown in Figure 2 and the lower face of the slide member C is correspondingly convex or cylindrical. The head D or supporting member for the pin is provided with a plane horizontal lower surface L abutting plane faces O on the upper side of the slide member C so that proper elevation of the pin G may be obtained by inserting or removing shims between the surfaces L and O. Thus, as the guide surfaces of the guide B and the slide member C wear, the proper elevation of the pin G may still be obtainable.

Means are provided for preventing the slide member C from lifting from the guide B and also from rotating therein. To this end a guide plate P is provided which is inserted into the head D and the slide member C, and attached at its ends to the guide B, being spaced therefrom by blocks Q and held in place by means of suitable bolts or cap screws R. The guide plate P is provided with a plane lower surface P' adapted to cooperate with the upper plane surface S of the slide member C. The proper clearance between the guide B and the slide C is obtainable by shims inserted between the ends of the guide plate P and the spacer blocks Q. When the slide member C or any of the wearing surfaces have been worn, looseness or play may be taken out by removing shims of the proper thickness from between the guide plate P and the spacer blocks Q.

The bearing box of the connecting rod adapted to cooperate with the pins G may be of any suitable form. As shown in Figure 1, the bearing box is rectangular and is adapted to receive two bearing blocks T and U. One of the bearing blocks, as for instance U, is provided with a beveled face V against which a sliding beveled key W is arranged to bear. A bolt X threaded in the key W tightens or loosens the bearing blocks U with respect to the pin G. A lock nut Y is adapted to hold the key W firmly in place.

In addition to being clamped in the forked ends J of the head E by means of the bolts K the pin G is also held in place by a flanged head Z and a nut $b$ and washer $c$. By tightening the nut $b$, the forked ends of the head B may be brought together somewhat to take out looseness or side play of the bearing of the connecting rod H.

I claim:

1. A cross head and guide construction comprising a guide having a concave cylindrical guiding surface, a cross head having a slide member formed with a cylindrical lower bearing surface and a plane upper bearing surface, and a guide plate spaced from and supported on said guide and passing through said cross head, said guide plate having a plane lower surface to cooperate with the upper bearing surface of said slide member.

2. A cross head and guide construction comprising a guide having a concave cylindrical guide surface, a cross head having a slide member formed with a convex lower bearing surface cooperative with said guiding surface and a plane upper bearing surface, a reinforced guide plate spaced from and supported by said guide and having a plane lower surface cooperating with the plane upper bearing surface on said slide member, said guide plate passing through said cross head.

3. A cross head and guide construction comprising a guide having a concave cylindrical guide surface, a cross head having a slide member formed with a convex lower bearing surface cooperative with said guiding surface and a plane upper bearing surface, a reinforced guide plate spaced from and supported by said guide and having a plane lower surface cooperating with the plane upper bearing surface on said slide member, said guide plate passing through said cross head, and spacer blocks between the ends of the guide plate and the guide.

In testimony whereof I have signed this specification.

FREDERICK W. PARSONS.